April 18, 1961 A. E. SASSMANN 2,980,191
SOIL TURNING DEVICE FOR PLOWS
Filed Aug. 20, 1958 2 Sheets-Sheet 2

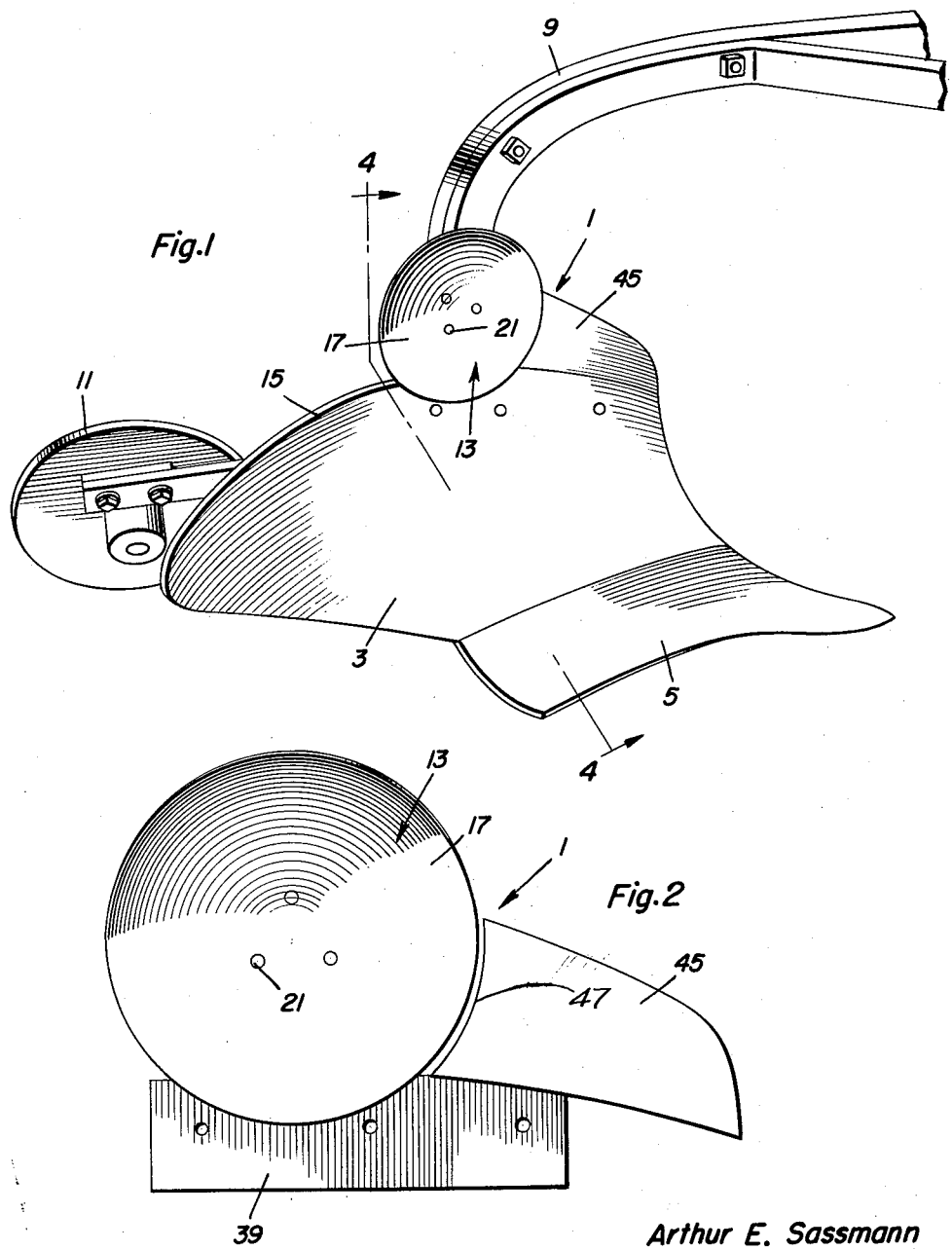

Arthur E. Sassmann
INVENTOR.

2,980,191
SOIL TURNING DEVICE FOR PLOWS

Arthur E. Sassmann, Alma, Mo.
(209 W. 5th St., Leon, Iowa)

Filed Aug. 20, 1958, Ser. No. 756,105

3 Claims. (Cl. 172—164)

This invention relates to improvements in soil turning devices for attachment to moldboard plows.

By way of premise, in plowing up fields of sod of dried growths of previously planted crops, it has been found that the moldboards of conventional moldboard plows fail to turn the plowed up sod over sufficiently so that the dried up growths are turned completely under to the bottom of the furrows, to decompose and fertilize the furrows as is highly desirable. This occurs because the crest of the plowed up sod with growth thereon frequently rises above the top of the moldboard at the front of said moldboard.

Having the foregoing in mind, the primary object of this invention is to provide an efficient device for attachment to moldboards of plows to turn plowed up sod outwardly and forwardly from the moldboards to facilitate turning growths in plowed up sod completely under to the bottom of the furrows as they are being plowed.

Another object is to provide a device for the purpose set forth in the foregoing which is attachable to conventional plow moldboards without material alteration in the moldboards and which is adjustable to vary turning of sod thereby according to requirements, and is of simple, durable and inexpensive construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in perspective of a plow having this improved sod turning device attached to the moldboard thereof;

Figure 2 is an enlarged view of the device detached and viewed from the outer side thereof;

Figure 3:
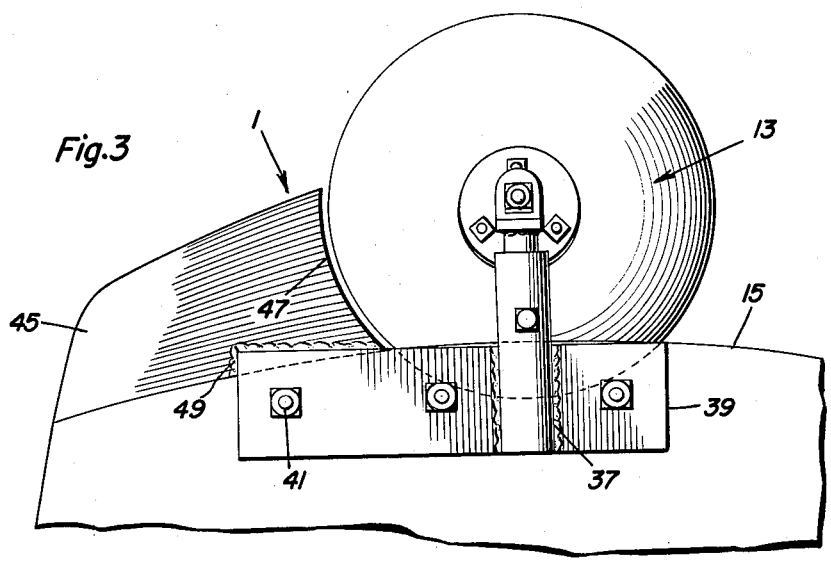
Figure 3 is an enlarged fragmentary view of the device detached and viewed from the rear side thereof.
Figure 4:
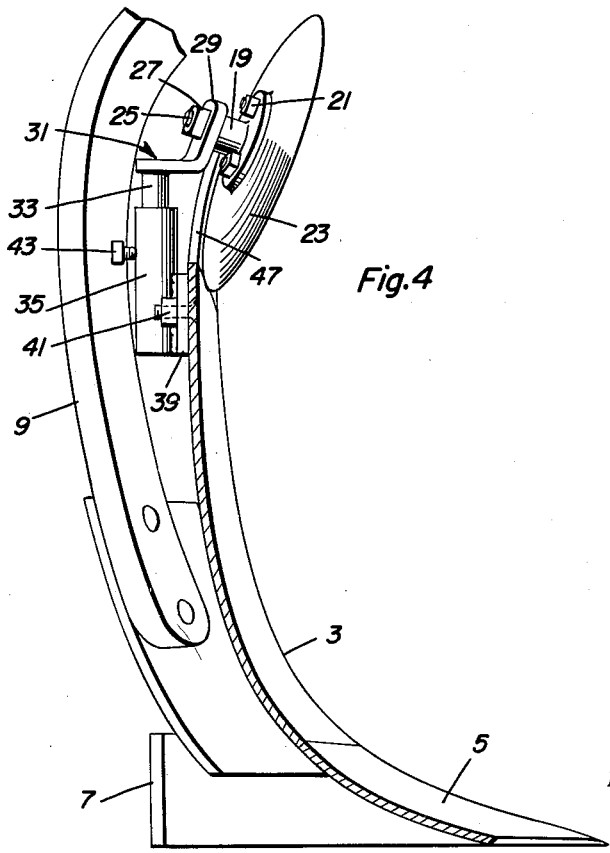
Figure 4 is an enlarged fragmentary view in vertical cross-section taken on the line 4—4 of Figure 1.

Referring by numerals to the accompanying drawings, the sod turning device, which is designated generally by the numeral 1, has been shown therein as attached to a conventional plow including the usual moldboard 3 having a front side for turning sod forwardly and laterally thereof out of a furrow, share 5, landside 7, plow beam 9 and furrow wheel 11.

The sod turning device 1 comprises a concavo-convex sod turning disk 13. The disk 13 is rotatably mounted, by means presently described, to overlap and extend upwardly above the top edge 15 of the moldboard 3 forwardly thereof and in overlapping closely spaced relation at its bottom thereto, with its concave front side 17 facing forwardly of the moldboard 3 and the disk inclined upwardly and also rearwardly forwardly of said moldboard 3.

Mounting means for the sod turning disk 13 comprises the following. A hub 19 is bolted, as at 21 to the rear convex side 23 of said disk 13 and which rotatably mounts the disk 13 on a spindle 25. The spindle 25 is fixed above the top edge 15 of the moldboard 3 transversely thereof by a nut 27 and in an upstanding portion 29 of an obtuse angled bracket 31 fixed on the upper end of an upright shaft 33 depending from said bracket. Thus the disk 13 is rotatable about an axis above and transverse to the moldboard 3 and inclined forwardly and downwardly of the moldboard 3 so that the disk 13 is inclined as above set forth.

The shaft 33 is rotatably and vertically slidably adjustable, for a purpose presently seen, in an upright bearing sleeve 35 welded, as at 37 to an attaching cross bar 39 extending along the back of the moldboard 3 at the top edge of said moldboard, and detachably bolted, as at 41 to said moldboard 3. A set bolt 43 in the bearing sleeve 35 provides for holding the shaft 33 in different adjusted positions. Any conventional anti-friction bearing means, not shown, may be provided in the hub 19.

An elongated forwardly tapering, deflector plate 45 with a concave rear end 47 conforming to the rim of the disk opposite said rim is welded, as at 49, on the attaching bar 39 to extend along the top edge 15 of the moldboard 3 rearwardly from the front edge of the moldboard 3 in upstanding position and in front of the disk 13 to guide the crest of sod either at or above the top edge 15 to the disk 13 below the axis of rotation of said disk.

The operation of the device is as follows: As a furrow is plowed any sod at its crest rising above or to the top edge 15 of the moldboard 3 is deflected by the deflector plate 45 rearwardly against the disk 13 below the axis of rotation of said disk, thereby causing the disk 13 to rotate rearwardly and upwardly to reduce opposition to progress of the plow. Because of the described location and inclination of the disk 13, the sod at and above the moldboard 13 which is to say the crest of the sod is turned outwardly and forwardly of the moldboard 3 so that as the sod leaves the moldboard 3 any growth or vegetation on the sod is turned completely under.

By adjusting shaft 33 rotatably and vertically the disk 13 may be swingably adjusted about the axis of the shaft, transversely of the moldboard 3, and also adjusted vertically to vary the angle of inclination of the disk 13 relative to the moldboard 3 and the distance that said disk 13 rises above said moldboard 3, and whereby to vary the sod turning operation of the disk 13 as may be required in turning under heavy, or light growths on heavy and light sod. As will be seen, the device functions as an auxiliary sod turning device which acts in conjunction with the moldboard 3 for the purpose set forth in the foregoing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for turning sod at the upper edge portion of a plow moldboard outwardly and forwardly of the front side of the moldboard to facilitate turning of sod completely under during plowing comprising a disk, a bar attachable to the rear side of a moldboard, and means mounting said disk on said bar to extend above the moldboard forwardly of said front side at said upper edge portion in closely spaced relation thereto for rotation about an axis transverse to the moldboard in a position in which said disk is inclined upwardly forwardly of said edge portion and also rearwardly away from said edge portion, whereby the crest of sod at and above the upper edge portion of the moldboard may engage the disk below said axis to rotate the disk in the direction of travel of a plow in response to travel of the plow, said mounting means including a spindle extending across said upper edge of the moldboard and inclined forwardly and downwardly of said front side, and a deflector plate fixed to said bar to extend along the upper edge portion of the moldboard from said disk to the leading edge of the moldboard to deflect the sod above the moldboard to said disk and having a concave rear end in which said disk rotates, whereby sod is deflected from said deflector plate directly to said disk.

2. A device according to claim 1, said bar having a portion extending above said upper edge portion of the moldboard and having said deflector plate attached thereto.

3. A device according to claim 2, said deflector plate being secured to said portion of the bar at said rear end of said deflector plate.

References Cited in the file of this patent

UNITED STATES PATENTS

| | | |
|---|---|---|
| 362,023 | Lowden | Apr. 26, 1887 |
| 1,168,594 | Berendes | Jan. 18, 1916 |
| 1,289,254 | Pecore | Dec. 31, 1918 |
| 1,346,363 | York | July 13, 1920 |
| 1,537,898 | Stone | May 12, 1925 |
| 2,084,055 | Cascadden | June 15, 1937 |
| 2,839,983 | Walsh | June 24, 1958 |